US012170410B2

(12) United States Patent
Desclos et al.

(10) Patent No.: US 12,170,410 B2
(45) Date of Patent: Dec. 17, 2024

(54) ANTENNA WITH MULTIPLE COUPLED REGIONS

(71) Applicant: KYOCERA AVX Components (San Diego), Inc., San Diego, CA (US)

(72) Inventors: Laurent Desclos, San Diego, CA (US); Chew Chwee Heng, Singapore (SG); Sebastian Rowson, San Diego, CA (US); Jeffrey Shamblin, San Diego, CA (US)

(73) Assignee: Kyocera AVX Components (San Diego), Inc., San Diego, CA (US)

( * ) Notice: Subject to any disclaimer, the term of this patent is extended or adjusted under 35 U.S.C. 154(b) by 0 days.

(21) Appl. No.: 18/359,679

(22) Filed: Jul. 26, 2023

(65) Prior Publication Data

US 2023/0369763 A1 Nov. 16, 2023

Related U.S. Application Data

(63) Continuation of application No. 17/170,212, filed on Feb. 8, 2021, now Pat. No. 11,764,472, which is a continuation of application No. 15/948,203, filed on Apr. 9, 2018, now Pat. No. 10,916,846, which is a continuation of application No. 14/885,981, filed on (Continued)

(51) Int. Cl.

| | |
|---|---|
| ***H01Q 5/30*** | (2015.01) |
| ***H01Q 5/321*** | (2015.01) |
| ***H01Q 5/328*** | (2015.01) |
| ***H01Q 5/378*** | (2015.01) |
| ***H01Q 5/385*** | (2015.01) |
| ***H01Q 7/00*** | (2006.01) |
| ***H01Q 9/06*** | (2006.01) |

(Continued)

(52) U.S. Cl.

CPC ............ *H01Q 5/328* (2015.01); *H01Q 5/321* (2015.01); *H01Q 5/378* (2015.01); *H01Q 5/385* (2015.01); *H01Q 7/005* (2013.01); *H01Q 9/06* (2013.01); *H01Q 9/42* (2013.01); *H01Q 19/005* (2013.01)

(58) Field of Classification Search

CPC ........... H01Q 5/378–392; H01Q 1/243; H01Q 7/005; H01Q 9/42

See application file for complete search history.

(56) References Cited

U.S. PATENT DOCUMENTS

| | | | |
|---|---|---|---|
| 5,966,097 | A | 10/1999 | Fukasawa et al. |
| 6,339,402 | B1 | 1/2002 | McKivergan |

(Continued)

OTHER PUBLICATIONS

Rowson et al. "Isolated Magnetic Dipole Antenna: Application to GPS," Microwave and Optical Technology Letters, vol. 41, Issue 6, Jun. 20, 2004, pp. 449-451.

(Continued)

*Primary Examiner* — Hasan Islam

(74) *Attorney, Agent, or Firm* — Dority & Manning, P.A.

(57) ABSTRACT

A device includes a plurality of antennas, including one or more active antennas, the antennas being configured in one of a plurality of possible configurations to achieve operation in WAN, LTE, WiFi, or WiMax bands, or a combination thereof. In some embodiments, a passive antenna is utilized with lumped loading to fix the antenna tuning state. A primary and auxiliary radiator can be included in the device and configured for WAN/LTE bands, while additional antennas can be incorporated for WiFi and WiMax bands. Various antenna configurations incorporate the antenna having multiple coupled regions.

17 Claims, 15 Drawing Sheets

Related U.S. Application Data

Oct. 16, 2015, now Pat. No. 9,941,588, which is a continuation-in-part of application No. 13/767,854, filed on Feb. 14, 2013, now Pat. No. 9,190,733, which is a continuation-in-part of application No. 13/289, 901, filed on Nov. 4, 2011, now Pat. No. 8,717,241, which is a continuation of application No. 12/894, 052, filed on Sep. 29, 2010, now Pat. No. 8,077,116, said application No. 13/767,854 is a continuation of application No. 12/536,419, filed on Aug. 5, 2009, said application No. 12/894,052 is a continuation of application No. 11/841,207, filed on Aug. 20, 2007, now Pat. No. 7,830,320.

(51) Int. Cl.

| | |
|---|---|
| ***H01Q 9/42*** | (2006.01) |
| ***H01Q 19/00*** | (2006.01) |

(56) References Cited

U.S. PATENT DOCUMENTS

| | | | |
|---|---|---|---|
| 6,456,249 | B1 | 9/2002 | Johnson |
| 6,480,155 | B1 | 11/2002 | Eggleston |
| 6,765,536 | B2 | 7/2004 | Phillips et al. |
| 7,026,999 | B2 | 4/2006 | Umehara |
| 7,215,289 | B2 | 5/2007 | Harano |
| 7,271,770 | B2 | 9/2007 | Washiro |
| 7,315,289 | B2 | 1/2008 | Puente Baliarda et al. |
| 7,319,432 | B2 | 1/2008 | Andersson |
| 7,372,406 | B2 | 5/2008 | Shiotsu et al. |
| 7,425,924 | B2 | 9/2008 | Chung et al. |
| 7,764,236 | B2 | 7/2010 | Hill |
| 7,911,402 | B2 | 3/2011 | Rowson et al. |
| 8,144,072 | B2 | 3/2012 | Chiang et al. |
| 8,577,289 | B2 | 11/2013 | Schlub et al. |
| 2003/0098812 | A1 | 5/2003 | Ying et al. |
| 2003/0160728 | A1 | 8/2003 | Fukushima et al. |
| 2003/0193438 | A1 | 10/2003 | Yoon |
| 2004/0027286 | A1 | 2/2004 | Poilasne et al. |
| 2004/0095280 | A1 | 5/2004 | Poilasne |
| 2004/0145523 | A1 | 7/2004 | Shamblin |
| 2004/0233109 | A1 | 11/2004 | Ying et al. |
| 2005/0153756 | A1 | 7/2005 | Sato |
| 2005/0190110 | A1 | 9/2005 | Taromaru |
| 2005/0192727 | A1 | 9/2005 | Shostak et al. |
| 2005/0275596 | A1 | 12/2005 | Harano |
| 2006/0152411 | A1 | 7/2006 | Iguchi et al. |
| 2006/0220966 | A1 | 10/2006 | Sarychev et al. |
| 2007/0069958 | A1 | 3/2007 | Ozkar |
| 2007/0268190 | A1 | 11/2007 | Huynh |
| 2008/0001829 | A1 | 1/2008 | Rahola et al. |
| 2009/0051611 | A1 | 2/2009 | Shamblin et al. |
| 2009/0224991 | A1 | 9/2009 | Rowson et al. |
| 2009/0295648 | A1 | 12/2009 | Dorsey |
| 2012/0299781 | A1 | 11/2012 | Lee |
| 2013/0033400 | A1 | 2/2013 | Chiang |

OTHER PUBLICATIONS

International Search Report for PCT Application No. PCT/US2008/073612.

| Configuration | 214 | 212 | 211 | 213 |
|---|---|---|---|---|
| 1 | Passive | Passive | Active | Passive |
| 2 | Passive | Passive | Active | Active |
| 3 | Active | Passive | Active | Passive |
| 4 | Passive | Active | Passive | Passive |
| 5 | Active | Active | Passive | Passive |
| 6 | Passive | Active | Passive | Active |
| 7 | Passive | Active | Active | Passive |
| 8 | Active | Active | Active | Passive |
| 9 | Active | Active | Active | Active |

*FIG.23*

ANTENNA WITH MULTIPLE COUPLED REGIONS

CROSS-REFERENCE TO RELATED APPLICATIONS

This application is a continuation in part (CIP) of U.S. Ser. No. 13/767,854, filed Feb. 14, 2013, titled "ANTENNA WITH MULTIPLE COUPLED REGIONS";

which is a continuation (CON) of U.S. Ser. No. 12/536, 419, filed Aug. 8, 2009, titled "ANTENNA WITH MULTIPLE COUPLED REGIONS"; and a CIP of U.S. Ser. No. 13/289,901, filed Nov. 4, 2011, titled "ANTENNA WITH ACTIVE ELEMENTS", which is a CON of U.S. Ser. No. 12/894,052, filed Sep. 29, 2010, titled "ANTENNA WITH ACTIVE ELEMENTS"; which is a CON of U.S. Ser. No. 11/841,207, filed Aug. 20, 2007, titled "ANTENNA WITH ACTIVE ELEMENTS";

the contents of each of which are hereby incorporated by reference.

FIELD OF THE INVENTION

This invention relates generally to the field of wireless communication. In particular, the present invention relates to antennas and methods of improving frequency response and selection for use in wireless communications.

BACKGROUND OF THE INVENTION

Commonly owned U.S. Pat. No. 6,677,915 filed Feb. 12, 2001, titled "SHIELDED SPIRAL SHEET ANTENNA STRUCTURE AND METHOD", U.S. Pat. No. 6,906,667 filed Feb. 14, 2002, titled "MULTIFREQUENCY MAGNETIC DIPOLE ANTENNA STRUCTURES FOR VERY LOW PROFILE ANTENNA APPLICATIONS"; U.S. Pat. No. 6,900,773 filed Nov. 18, 2002, titled "ACTIVE CONFIGURABLE CAPACITIVELY LOADED MAGNETIC DIPOLE"; and U.S. Pat. No. 6,919,857 filed Jan. 27, 2003, titled "DIFFERENTIAL MODE CAPACITIVELY LOADED MAGNETIC DIPOLE ANTENNA", describe an Isolated Magnetic Dipole (IMD) antenna formed by coupling one element to another in a manner that forms a capacitively loaded inductive loop, setting up a magnetic dipole mode, the entire contents of which are hereby incorporated by reference. This magnetic dipole mode provides a single resonance and forms an antenna that is efficient and well isolated from the surrounding structure. This is, in effect, a self resonant structure that is de-coupled from the local environment.

The overall structure of the IMD antenna can be considered as a capacitively loaded inductive loop. The capacitance is formed by the coupling between the two parallel conductors with the inductive loop formed by connecting the second element to ground. The length of the overlap region between the two conductors along with the separation between conductors is used to adjust the resonant frequency of the antenna. A wider bandwidth can be obtained by increasing the separation between the conductors, with an increase in overlap region used to compensate for the frequency shift that results from the increased separation.

An advantage of this type of antenna structure is the method in which the antenna is fed or excited. The impedance matching section is almost independent from the resonant portion of the antenna. This leaves great flexibility for reduced space integration. The antenna size reduction is obtained in this case by the capacitive loading that is equivalent to using a low loss, high dielectric constant material. At resonance a cylindrical current going back and forth around the loop is formed. This generates a magnetic field along the axis of the loop which is the main mechanism of radiation. The electrical field remains highly confined between the two elements. This reduces the interaction with surrounding metallic objects and is essential in obtaining high isolation.

The IMD technology is relatively new, and there is a need for improvements over currently available antenna assemblies. For example, because cell phones and other portable communications devices are moving in the direction of providing collateral services, such as GPS, video streaming, radio, and various other applications, the demand for multi-frequency and multi-band antennas is at a steady increase. Other market driven constraints on antenna design include power efficiency, low loss, reduced size and low cost. Therefore, there is a need in the art for antennas which exceed the current market driven requirements and provide multiple resonant frequencies and multiple bandwidths. Additionally, there is a need for improved antennas which are capable of being tuned over a multitude of frequencies. Furthermore, there is a need for improved antennas which are capable of dynamic tuning over a multitude of frequencies in real time.

SUMMARY OF THE INVENTION

This invention solves these and other problems in the art, and provides solutions which include forming additional capacitively loaded inductive loops by adding additional elements that couple to one of the two elements that form the basic IMD antenna. Other solutions provided by the invention include active tuning of multiple coupling regions, switching over a multitude of frequencies, and dynamic tuning of resonant frequencies.

In one embodiment, an antenna is formed by coupling a first element to a second element, and then adding a third element which is coupled to the second element. The first element is driven by a transceiver, with both the second and third elements connected to ground. The additional resonance that is generated is a product of two coupling regions on the composite antenna structure.

In another embodiment, an antenna is formed having a first element driven by a transceiver, and two or more grounded elements coupled to the first element. The space between each of the two or more grounded elements and the first element defines a coupling region, wherein the coupling region forms a single resonant frequency from the combined structure. The resonant frequency is adjusted by the amount of overlap of the two elements. The separation between the two elements determines the bandwidth of the resonance.

In another embodiment, an antenna is formed having a first element driven by a transceiver, a second element connected to ground wherein the second element overlaps with the first element to form a capacitive coupling region, and a third element. The third element can be either driven or grounded and overlaps with at least one of the first element and the second element. Each overlapping region between the first, second and third elements creates a capacitive coupling region forming a resonant frequency, wherein the resonant frequency is adjusted by the amount of overlap and the bandwidth is determined by the separation distance between the overlapping elements. In this embodiment, an overlapping region can be formed between the driven element and a grounded element, or alternatively the overlapping region can be formed between two grounded elements.

In another embodiment, the grounded elements are parallel to the driven element. Alternatively, the grounded elements can be orthogonal with respect to the driven element. One or more elements can comprise an active tuning component. The active tuning component can be configured within or near a ground plane. Alternatively, one or more active components can be configured on an antenna element. One or more antenna elements can be bent. One or more antenna elements can be linear, or planar. One or more antenna elements can be fixedly disposed above a ground plane. Alternatively, one or more antenna elements can be configured within a ground plane.

In another embodiment, an antenna is provided having a high band radiating element and a low band radiating element. A switched network can be integrated with at least one of the high band or low band radiating elements.

BRIEF DESCRIPTION OF THE DRAWINGS

FIG. 23 shows a configuration matrix of the antennas within a device as shown in FIG. 22.

DETAILED DESCRIPTION OF THE PREFERRED EMBODIMENTS

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

Embodiments of the present invention provide an active tuned loop-coupled antenna capable of optimizing an antenna over incremental bandwidths and capable of tuning over a large total bandwidth. The active loop element is capable of serving as the radiating element or an additional radiating element may also be coupled to this active loop. In various embodiments, multiple active tuned loops can be coupled together in order to extend the total bandwidth of the antenna. Such active components may be incorporated into the antenna structure to provide further extensions of the bandwidth along with increased optimization of antenna performance over the frequency range of the antenna.

Figure 1:
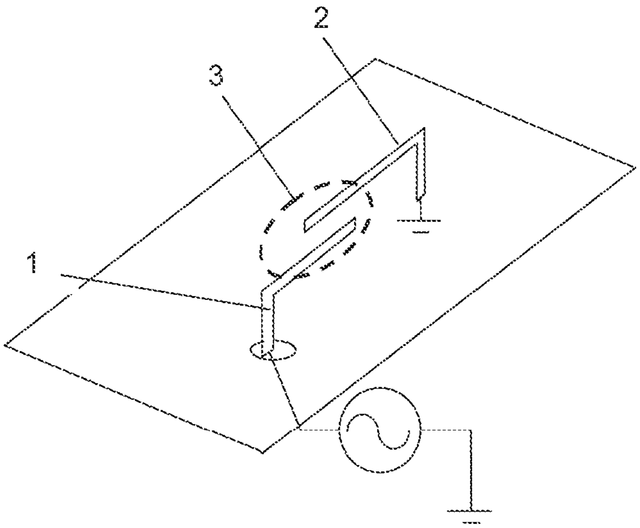
FIG. 1 illustrates an exemplary isolated magnetic dipole (IMD) antenna comprised of a first element attached to a transmitter and coupled to a second element which is connected to ground.

FIG. 1 illustrates a driven element 1, and a capacitively coupled element 2 that is grounded forming an inductive loop. The coupling region 3 between elements 1 and 2 forms a single resonant frequency from the combined structure. The resonant frequency is adjusted by the amount of overlap of the two elements. The separation between the two elements determines the bandwidth of the resonance.

Figure 2:
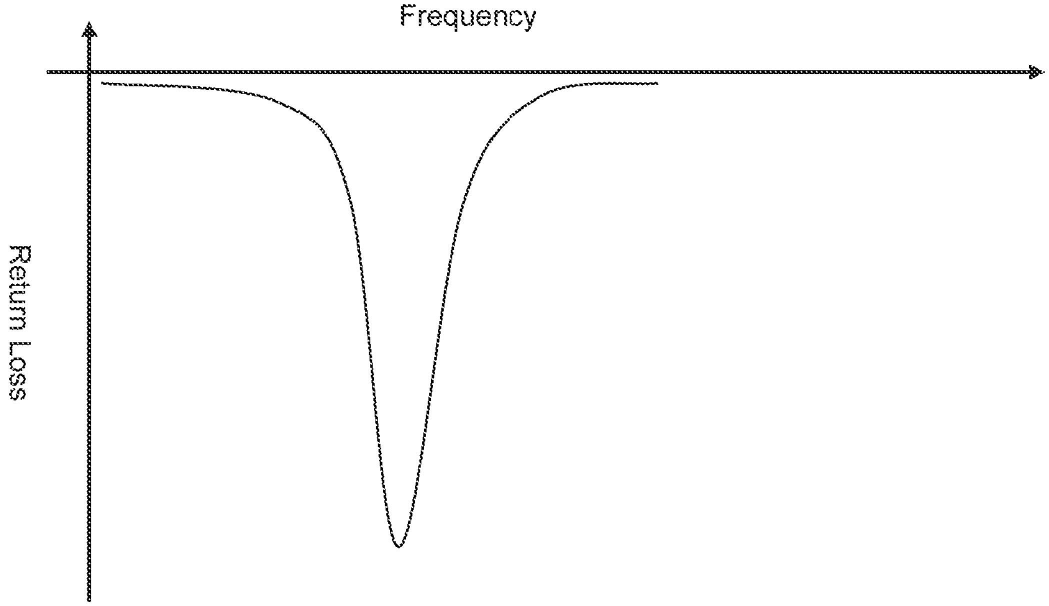
FIG. 2 shows a plot of return loss as a function of frequency for the IMD antenna in FIG. 1. A single resonance is present.

FIG. 2 illustrates a plot of frequency vs. return loss showing the effect of coupling a driven element and one capacitively coupled element that is grounded. A single resonant frequency is shown.

Figure 3:
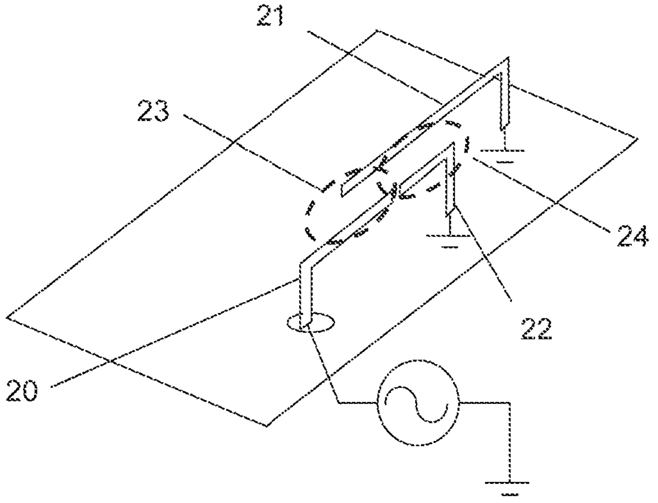
FIG. 3 illustrates an isolated magnetic dipole (IMD) antenna comprised of a first element attached to a transmitter and coupled to a second element which is connected to ground along with a third element which is coupled to the second element.

FIG. 3 illustrates a driven element 20, and two capacitively coupled elements 21 and 22 that are grounded forming inductive loops. The coupling 23 between elements 20 and 21, and the coupling 24 between 21 and 22 produces two resonant frequencies each determined by the amount of overlap and separation between the two elements. The separation between the elements determines the bandwidth for each resonance.

Figure 4:
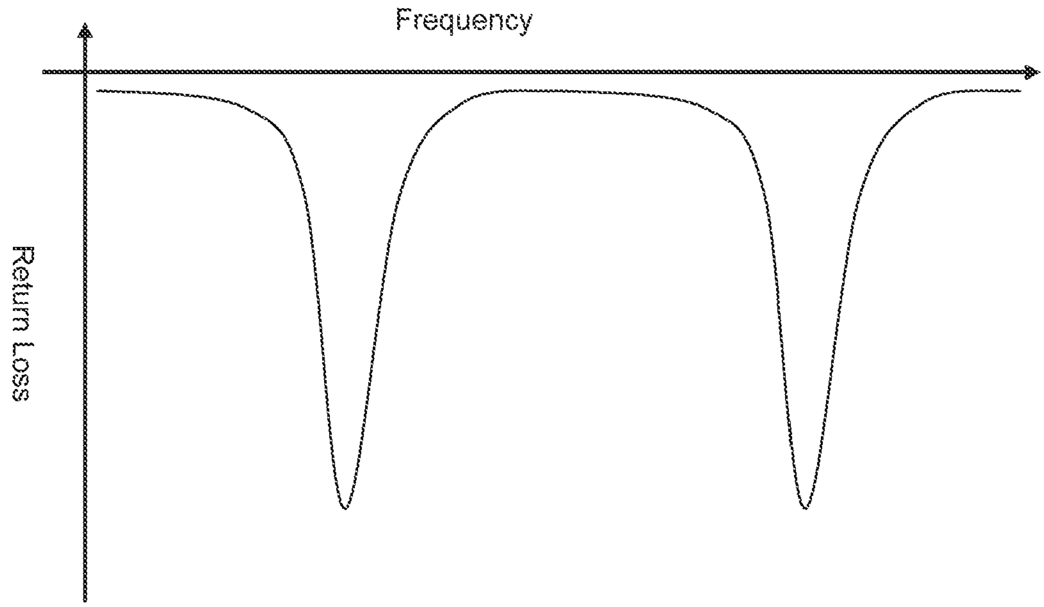
FIG. 4 shows the return loss as a function of frequency for the antenna shown in FIG. 3. A second resonance is present which is formed by the addition of the third element.

FIG. 4 illustrates a plot of frequency vs. return loss showing the effect of coupling a driven element and two capacitively coupled elements. Two resonate frequencies are shown.

Figure 5:
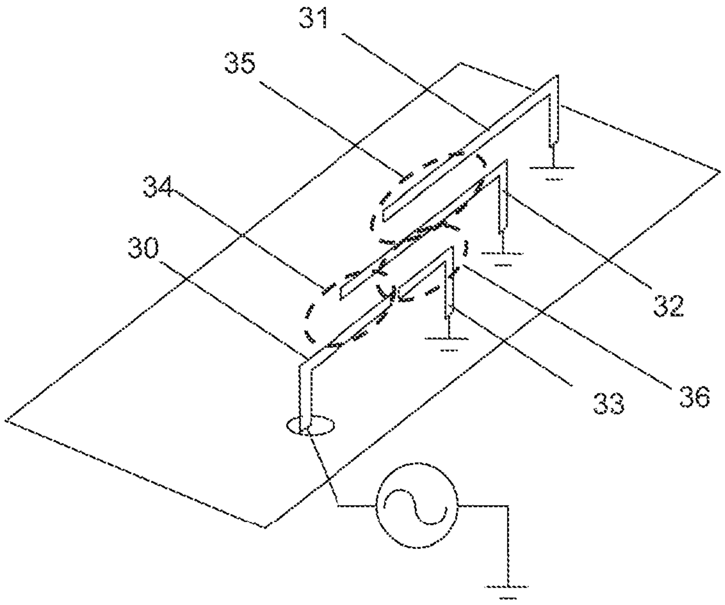
FIG. 5 illustrates an IMD antenna with two additional elements, a third and fourth, each coupled to the second element of the IMD antenna.

FIG. 5 illustrates a driven element 30, and three capacitively coupled elements 31, 32 and 33 that are grounded forming inductive loops. The coupling 34 between elements 30 and 32, the coupling 35 between 31 and 32 and coupling 36 between 32 and 33 produces three resonant frequencies each determined by the amount of overlap and separation between the three elements. The separation between the elements determines the bandwidth for each resonance.

Figure 6:
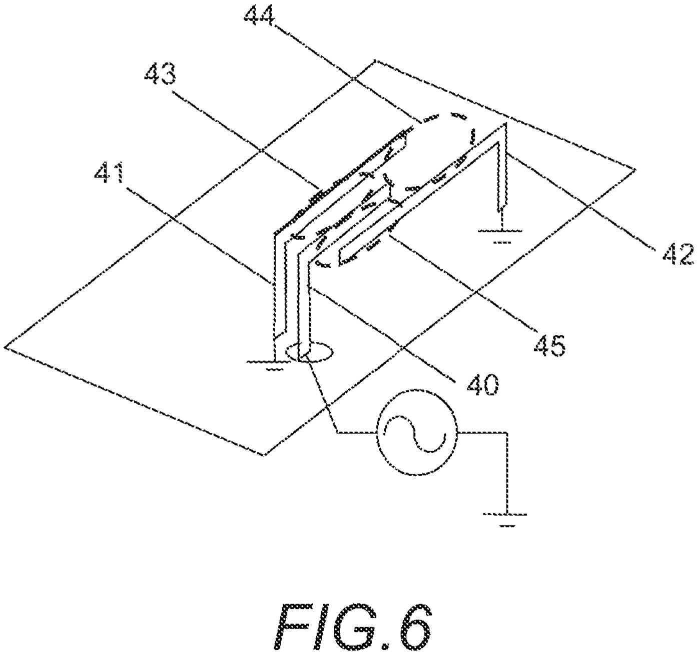
FIG. 6 illustrates an isolated magnetic dipole (IMD) antenna comprised of an element attached to a transmitter and coupled to a second element which is connected to ground along with a third element which is coupled to the first element.

FIG. 6 illustrates a driven element 40, and two capacitively coupled elements 41 and 42 that are grounded forming inductive loops. The positioning of the elements creates an overlapping between the elements that forms three couplings 43, 44 and 45. The separation between the elements determines the bandwidth for each resonance.

Figure 7:
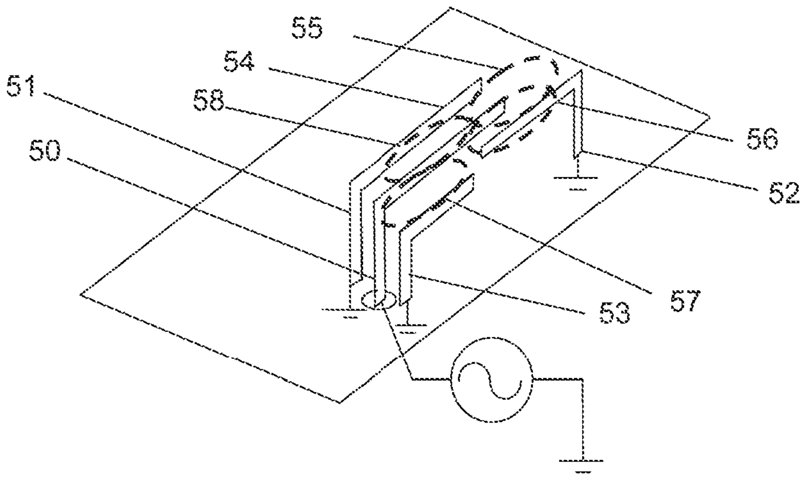
FIG. 7 illustrates an IMD antenna with two additional elements, a third and fourth, each coupled to the first element of the IMD antenna.
Figure 8:
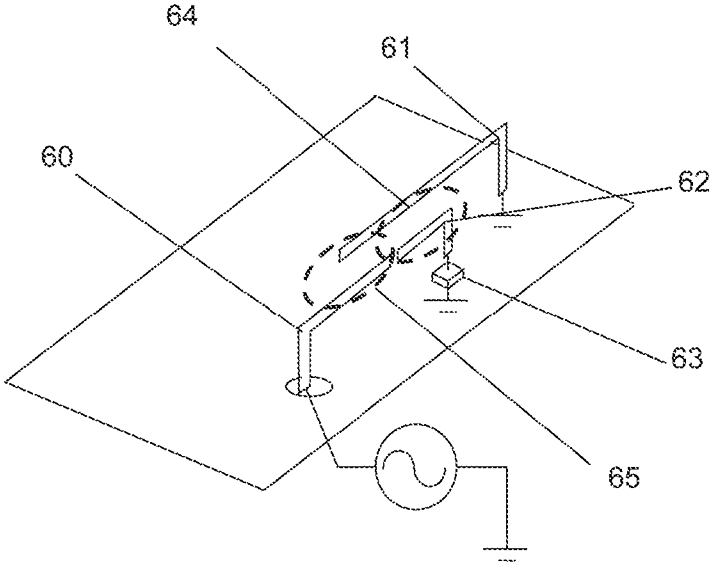
FIG. 8 illustrates an isolated magnetic dipole (IMD) antenna comprised of a first element attached to a transmitter and coupled to a second element which is connected to ground along with a third element which is coupled to the second element. A component is connected between the third element and ground.

FIG. 7 illustrates a driven element 50, and four capacitively coupled elements 51, 52, 53 and 54 that are grounded forming inductive loops. The positioning of the elements creates an overlapping between the elements that forms four couplings 55, 56, 57 and 58. The separation between the elements determines the bandwidth for each resonance, FIG. 8 illustrates a driven element 60 having a vertical portion thereof extending from a circuit board to a vertical terminus, and further having a horizontal portion extending from the vertical terminus to a horizontal terminus, with one capacitively coupled a first passive element 61 positioned adjacent to the driven element. At least a portion of the first passive element is configured to overlap with a at least a part of the horizontal portion of the driven element. The first, that passive element is connected to ground forming an inductive loop and further forming a coupling region 65 between the first passive element and the horizontal portion of the driven element. The frequency response generated by this coupling region 65 will be dependent upon the amount of overlap and separation distance of the elements 60 and 61. A second coupled element 62 is connected to ground via a component 63. If this component is passive (inductor, capacitor, resistor) it will create a fixed frequency response from the coupling region 64. If the component is tunable (tunable capacitor, varactor diode, etc.) then the frequency response can be dynamically tuned (in real time). The inductive loop including a current flow through the vertical portion and the horizontal portion of the driven element 60, wherein the current flow is bifurcated with a first portion of the current continuing through the first passive element 61 and a second portion of the current flowing through the active coupling element 62. Although not illustrated, those with skill in the art will appreciate the current flow based solely on the arrangement of the driven element, passive and active coupling elements and respective ground reference indicators.

Figure 9:
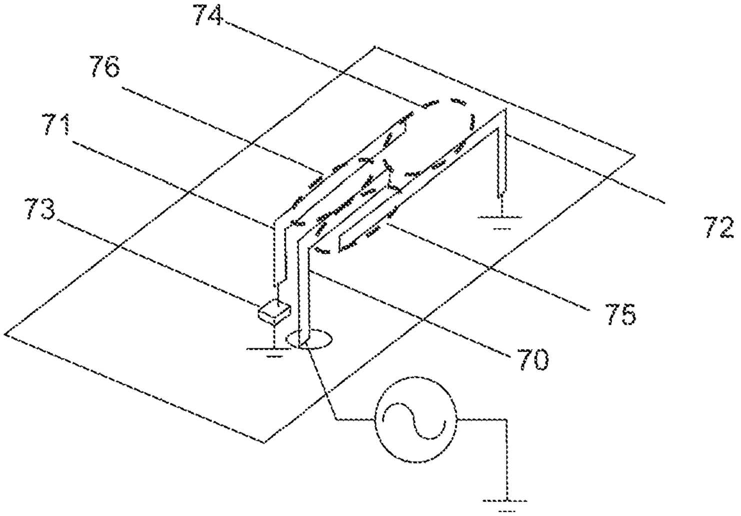
FIG. 9 illustrates an isolated magnetic dipole (IMD) antenna comprised of a first element attached to a transmitter and coupled to a second element which is connected to ground along with a third element which is coupled to the first element. A component is connected between the third element and ground.

FIG. 9 illustrates a driven element 70 with one capacitively coupled element 72 that is connected to ground forming an inductive loop and a coupling region 75. The frequency of this coupling region 75 will be dependent upon the amount of overlap and separation distance of the elements 70 and 72. The driven element 70 is also coupled to a second element 71 that is connected to ground via a component 73. If this component is passive (inductor, capacitor, resistor) it will create a fixed frequency response from the coupling region 76. If the component is tunable (tunable capacitor, varactor diode, etc.) then the frequency response can be dynamically tuned (in real time). Element 71 is also coupled to element 72 and will have a fixed or dynamically tuned frequency response, dependent on the type and value of component 73.

Figure 10:
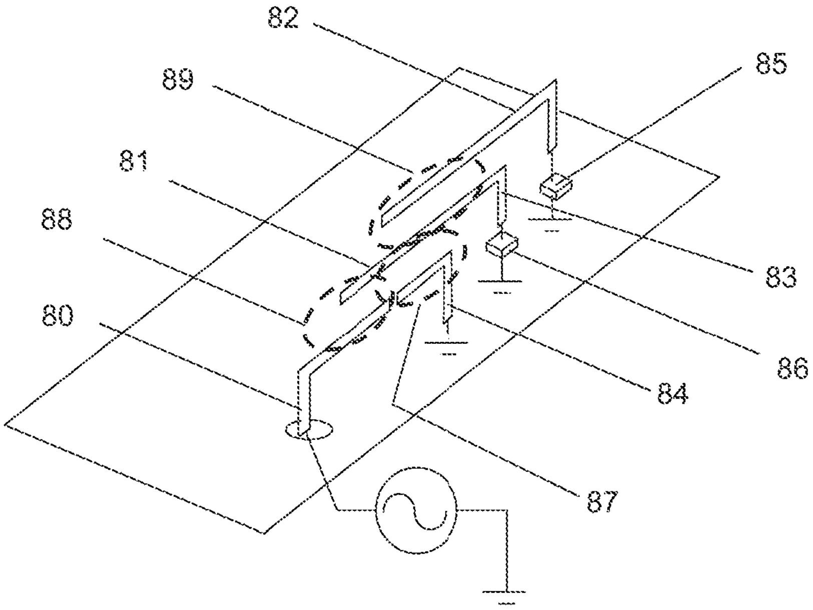
FIG. 10 illustrates an IMD antenna with two additional elements, a third and fourth, each coupled to the second element of the IMD antenna. A component is connected between the third element and ground, with another component connected between the second element and ground.

FIG. 10 illustrates a driven element 80 coupled to a second element 81 that is connected to ground vis a component 86. If this component is passive (inductor, capacitor, resistor) it will create a fixed frequency response from the coupling region 76. If the component is tunable (tunable capacitor, varactor diode, etc.) then the frequency response can be dynamically tuned (in real time). Element 81 forms a coupling 87 with element 84 that is connected to ground. The frequency of this coupling region 87 will be dependent upon the amount of overlap and separation distance of the elements 81, 84 and the driven element 80. Another coupling region 89 is formed by elements 81 and 82. Both elements are connected to ground by components 85 and 86.

Figure 11:
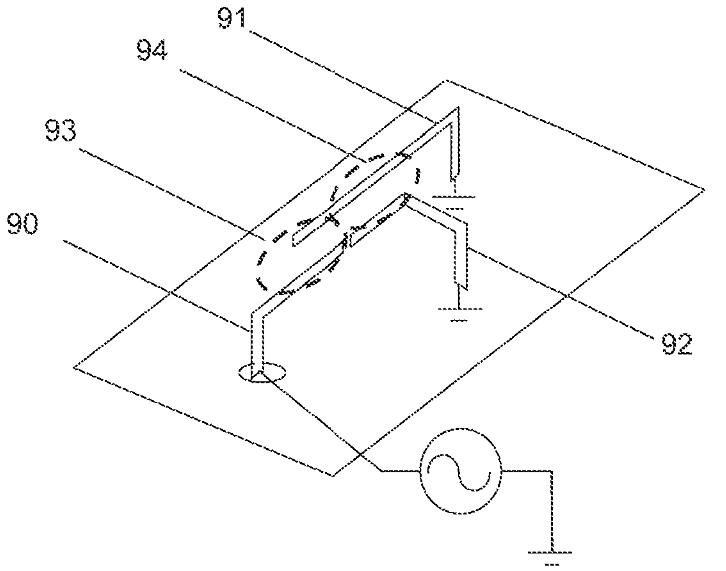
FIG. 11 illustrates an IMD antenna with an additional element coupled to the second element of the IMD antenna. The additional element is configured in a 3-dimensional shape and is not restricted to a plane containing the first two elements.

FIG. 11 illustrates a driven element 90 with one capacitively coupled element 91 that is connected to ground forming an inductive loop and a coupling region 93. An additional coupling is formed between capacitively coupled elements 91 and 92. The frequency of this coupling region 94 will be dependent upon the amount of overlap and separation distance of the elements 91 and 92 and driven element 90.

Figure 12:
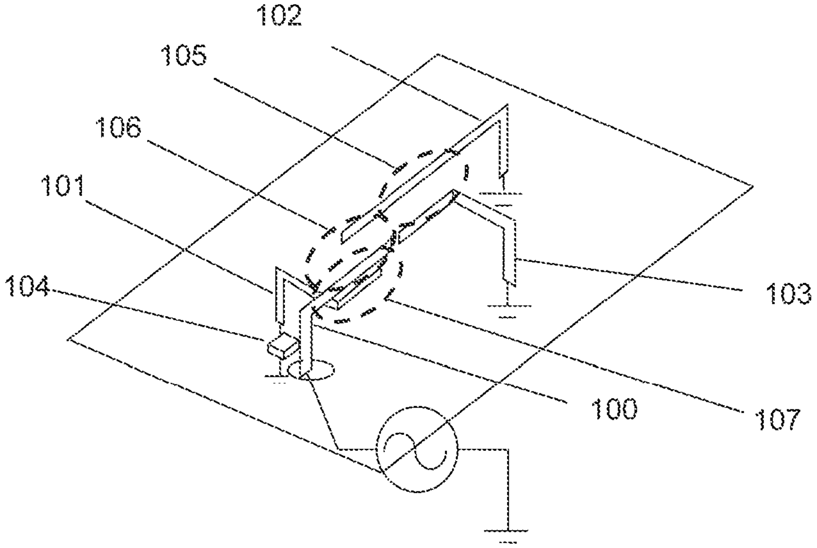
FIG. 12 illustrates an IMD antenna with two additional elements, a third and fourth, with the third element coupled to the second element and the fourth element coupled to the first element. Both the third and fourth elements are bent in 3 dimensional shapes and are not restricted to a plane containing the first two elements. A component is connected between the fourth element and ground.

FIG. 12 illustrates a driven element 100 with a capacitively coupled element 102 that is connected to ground forming an inductive loop and coupling region 106. Element 102 is capacitively coupled to element 103 that is connected to ground forming an inductive loop and coupling region 105. Element 103 is bent in a 3 dimensional shape and is not restricted to a plane containing the other elements. The driven element 100 is also coupled to a second element 101 that is connected to ground via a component 104 forming a coupling region 107 with driven element 100. If the component 104 is tunable (tunable capacitor, varactor diode, etc.) then the frequency response can be dynamically tuned (in real time). Element 101 is bent in a 3 dimensional shape and is not restricted to a plane containing the other elements.

Figure 13:
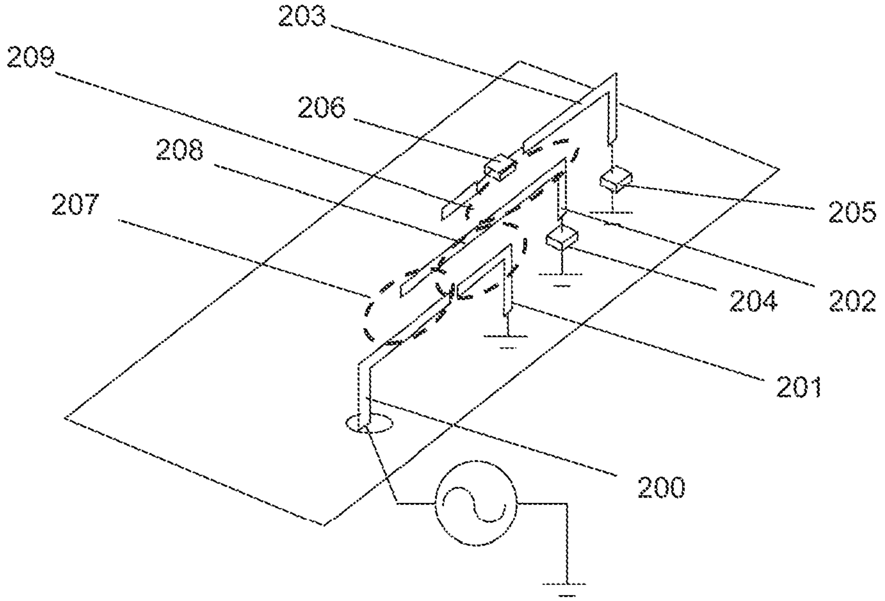
FIG. 13 illustrates an IMD antenna with two additional elements, a third and fourth, with a component connecting two portions of the third element.

FIG. 13 illustrates a driven element 200 in-line with element 201 that is connected to ground. The driven element 200 is coupled to a second element 202 that is connected to ground via a component 204 forming a coupling region 207 with driven element 200. If the component 204 is tunable (tunable capacitor, varactor diode, etc.) then the frequency response can be dynamically tuned (in real time). Element 202 also forms a coupling 209 with element 203 that is grounded via a component 205. In addition element 203 has a component 206 that connects the two parts of element 203 further extending frequency tuning and response.

Figure 14:
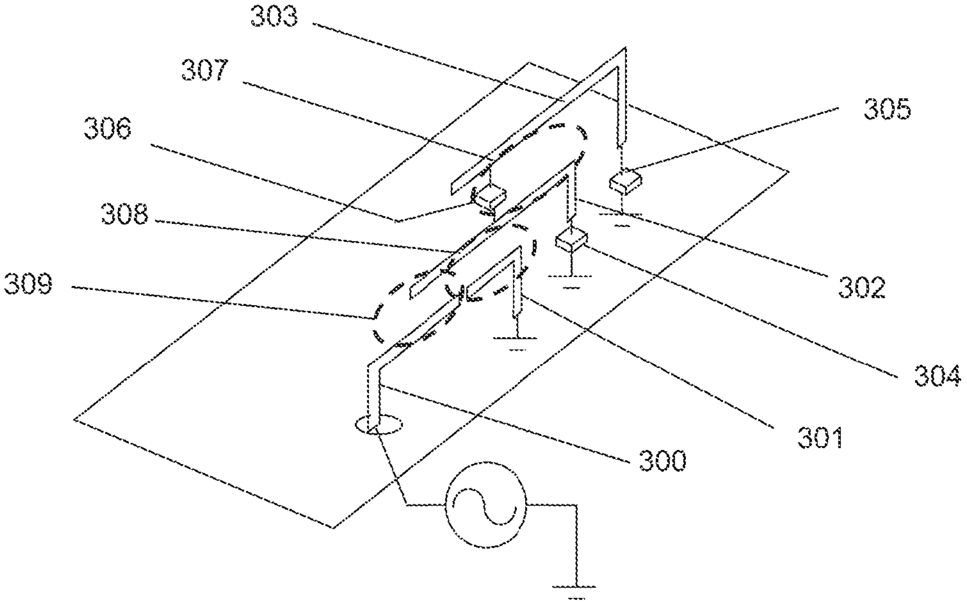
FIG. 14 illustrates an IMD antenna with two additional elements, a third and fourth, with a component connecting the third and fourth elements.

FIG. 14 illustrates a driven element 300 in-line with element 301 that is connected to ground. The driven element 300 is coupled to a second element 302 that is connected to ground via a component 304 forming a coupling region 309 with driven element 300. If the component 304 is tunable (tunable capacitor, varactor diode, etc.) then the frequency response can be dynamically tuned (in real time). Element 302 also forms a coupling 308 with element 301 that is is connected to ground forming an inductive loop. A further coupling is formed between element 302 and element. A component 306 is connected to elements 302 and 303, providing additional tuning of the frequency response.

Figure 15:
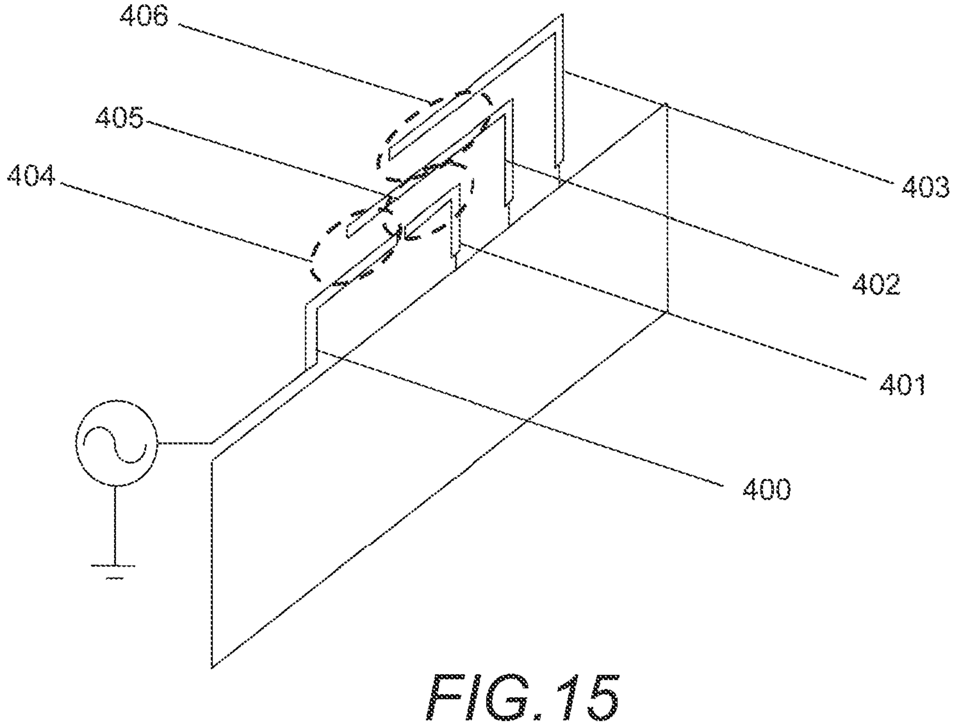
FIG. 15 illustrates an IMD antenna with two additional elements, a third and fourth, with all four elements positioned in the plane of the ground plane.

FIG. 15 FIG. 12 illustrates a driven element 400 with capacitively coupled elements 401, 402 and 403 that are connected to the edge of a ground plane producing three couplings 404, 405 and 406 respectively.

Figure 16:
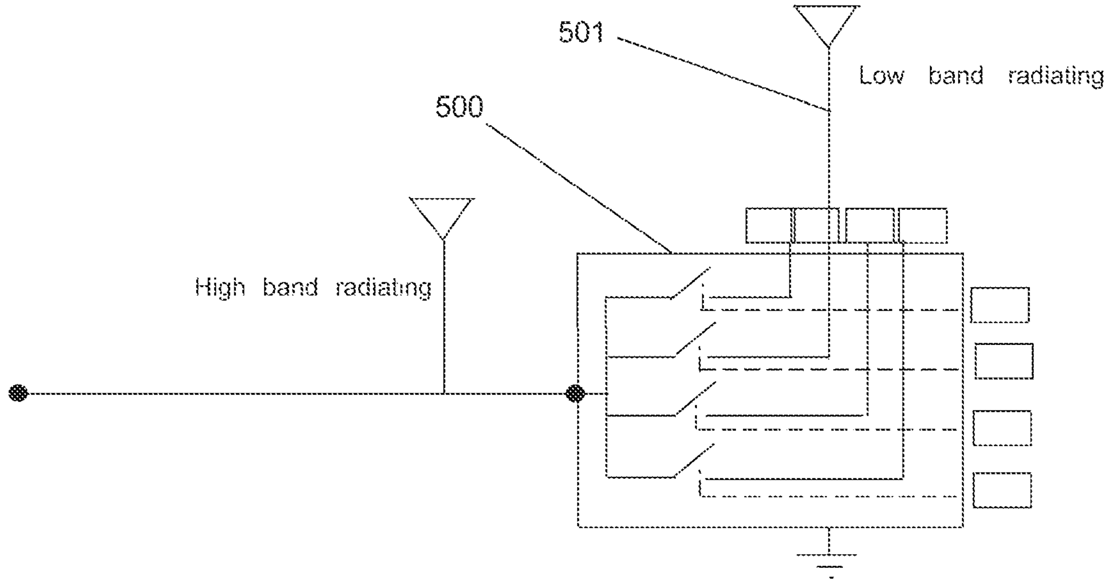
FIG. 16 illustrates an antenna configuration where a switch network is integrated into the low band radiating element to provide a tunable antenna. The switch network can implemented in a MEMS process, integrated circuit, or discrete components.

FIG. 16 illustrates an antenna configuration where a switch network 500 is integrated into the low band radiating element 501 to provide a tunable antenna. The switch network can be implemented in a MEMS process, integrated circuit, or discrete components.

Figure 17:
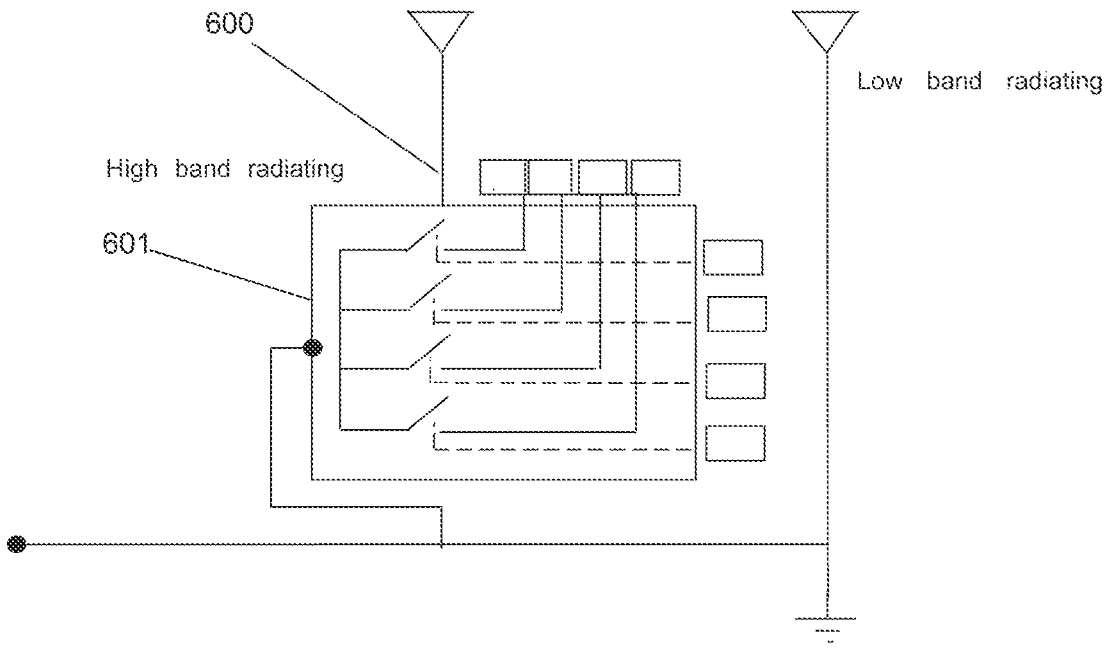
FIG. 17 illustrates an antenna configuration where a switch network is integrated into the high band radiating element to provide a tunable antenna. The switch network can be implemented in a MEMS process, integrated circuit, or discrete components.

FIG. 17 illustrates an antenna configuration where a switch network is integrated into the high band 600 radiating element to provide a tunable antenna. The switch network 601 can be implemented in a MEMS process, integrated circuit, or discrete components.

Figure 18:
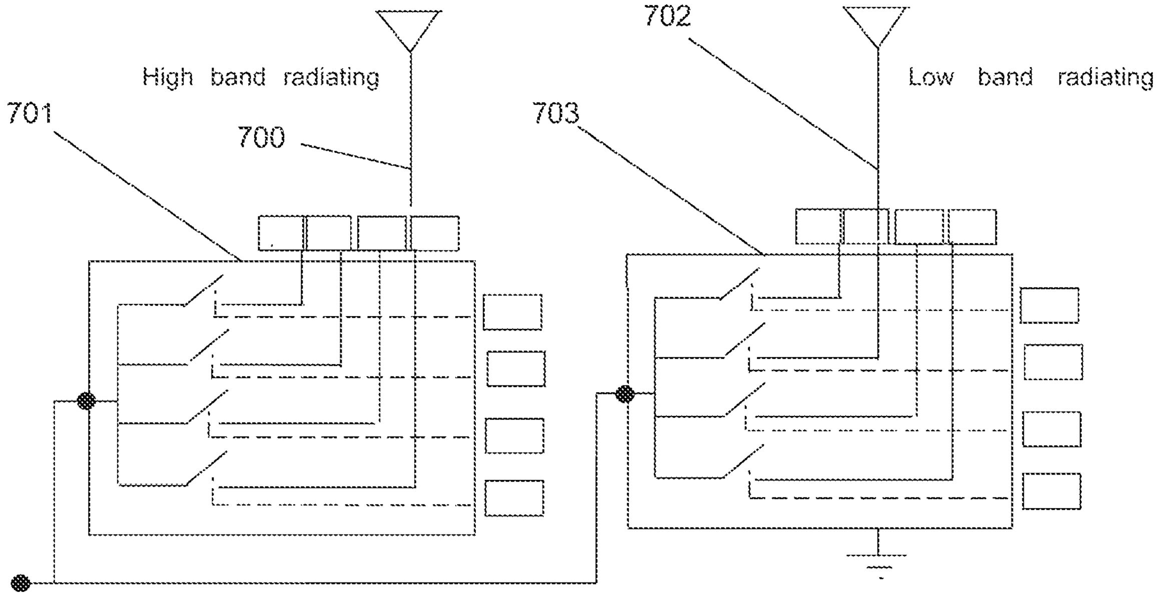
FIG. 18 illustrates an antenna configuration where switch networks are integrated into the low band and high band radiating elements to provide a tunable antenna. The switch networks can be implemented in a MEMS process, integrated circuit, or discrete components.

FIG. 18 illustrates an antenna configuration where switch networks are integrated into the low band 700 and high band 702 radiating elements to provide a tunable antenna. The switch networks 701 and 703 can be implemented in a MEMS process, integrated circuit, or discrete components.

Figure 19:
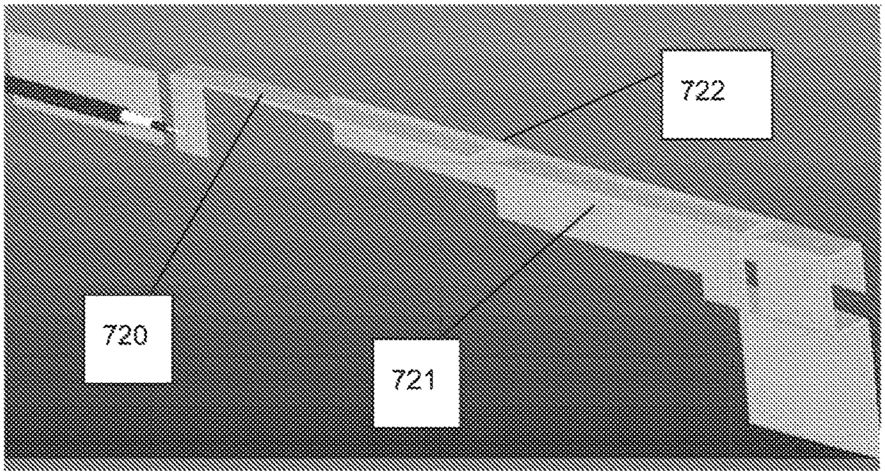
FIG. 19 illustrates an antenna implementation of the concept described in FIG. 3. A driven element is coupled to two additional elements, resulting in a low band and high band resonance.

FIG. 19 illustrates antenna implementation of the concept described in FIG. 3. A driven element 720 is coupled to two additional elements, 721 and 722, resulting in a low band and high band resonance.

Figure 20:
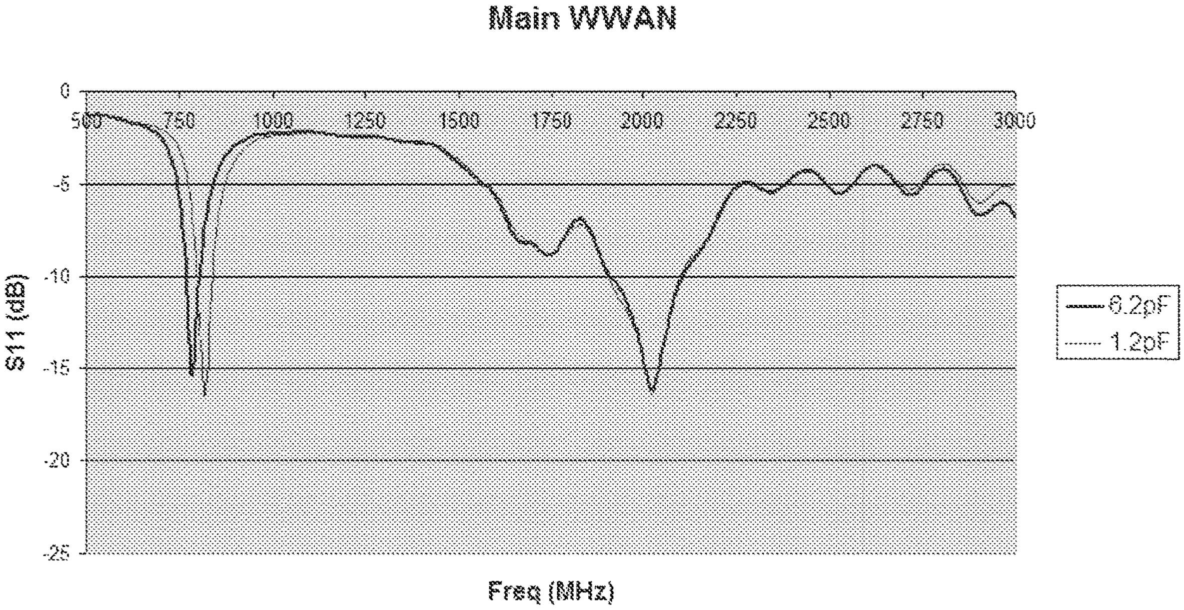
FIG. 20 shows the return loss of the antenna configuration shown in FIG. 19. The two traces refer to two capacitor values for component loadings of the second element. The capacitor is not shown in FIG. 19.

FIG. 20 illustrates a plot of frequency vs. return loss for the antenna described in FIG. 19. The two traces refer to two capacitor values for a component loading element 721.

In an embodiment, the antenna can comprise:

- a driven element positioned above a circuit board, the driven element being coupled to a transceiver at a feed;
- a first passive element positioned above the circuit board and adjacent to the driven element, the first passive element and the driver element configured to form a first coupling region therebetween, wherein the first passive element and the driven element are capacitively coupled at the first coupling region; and
- an active coupling element comprising a conductor being positioned near at least one of the driven element and the first passive element to form one or more active coupling regions, the active coupling element being coupled to an active tuning component for varying a tunable reactance thereof for adjusting a resonance of the active coupling regions.

In some embodiments, the antenna is configured to provide a first static frequency response associated with the first coupling region and a distinct dynamic frequency response associated with each of the one or more active coupling regions.

In some embodiments, the first passive element is coupled to a passive component selected from a capacitor, resistor, and an inductor.

In some embodiments, the active tuning component is selected from a variable capacitor, a variable inductor, a MEMS device, MOSFET, or a switch.

In some embodiments, the antenna comprises two or more passive elements.

In some embodiments, the antenna comprises two or more active coupling elements.

Now, in certain preferred embodiments, the antenna with multiple coupled regions can be implemented into a laptop computer, tablet, or other portable wireless communication device.

Figure 21:
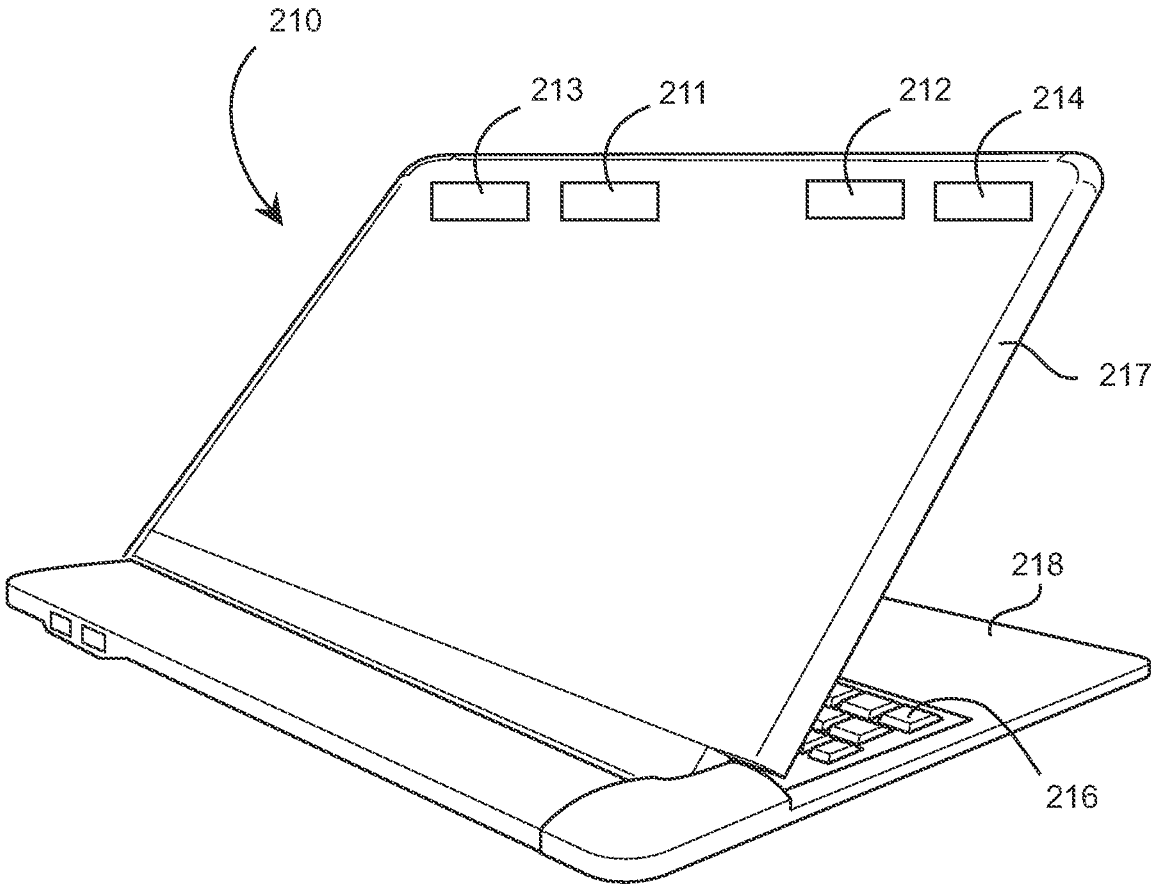
FIG. 21 shows a device with an integrated antennas, including an antenna with multiple coupled regions.

FIG. 21 shows a laptop computer 210 with a base portion 218 and a lid portion 217 hingedly coupled to the base portion. The lid portion generally includes a keyboard 216 and a display screen, such as an LCD display screen (not shown). Although a laptop is illustrated, the instant embodiment may be similarly practiced in a tablet or similar device. The laptop includes four antennas 211; 212; 213; and 214 integrated into the lid portion of the laptop near a bezel or periphery of the lid housing, as shown. A primary antenna 211 can be configured for WAN/LTE bands in accordance with commonly known frequency bands depending on region or carrier. An auxiliary antenna 212 can similarly be configured for WAN/LTE bands. Sub-band antennas 213 and 214 can be configured as WiFi, WiMax or any other sub-band for supplementing the primary and auxiliary antennas.

Although a particular arrangement is illustrated, it should be recognized that the antennas can be arranged in a variety of configurations and the invention is not limited to the arrangement as shown. The antennas can be placed about the periphery of the lid, or alternatively the antennas can be positioned about the base of the device.

Further, the device can contain any number of antennas from one to 'N', wherein N is an integer greater than one.

At least one of the primary and auxiliary antennas (WAN antenna) is an active antenna with at least one or multiple coupled regions. The remaining antennas can be configured as active or passive antennas, wherein an active antenna includes an antenna radiating element positioned adjacent to a parasitic element, the parasitic element coupled to an active tuning component for adjusting a load or reactance associated with the parasitic element thereby actively reconfiguring the antenna.

One or more of the antennas can include an isolated magnetic dipole (IMD) radiating element characterized by a conductor bent to form a loop defining an inductive region therebetween, and a portion of the bent conductor overlapping with itself to form a capacitive region, the inductive and capacitive regions creating a reactance sufficient to isolate the antenna element from nearby circuitry and/or components.

The multiple antennas can be combined to function as a multi-input multi-output (MIMO) antenna array for LTE and similar bands.

FIG. 23 shows a table containing various configurations of the antennas shown in the device of FIG. 21. Note that in a first configuration, antenna 211 includes an active antenna, whereas antennas 212; 213; and 214 each include passive antennas. In a second configuration, antennas 211 and 213 are each active antennas, whereas antennas 212 and 214 are each passive antennas (not actively adjustable). Several possible configurations are illustrated in FIG. 23.

Figure 22:
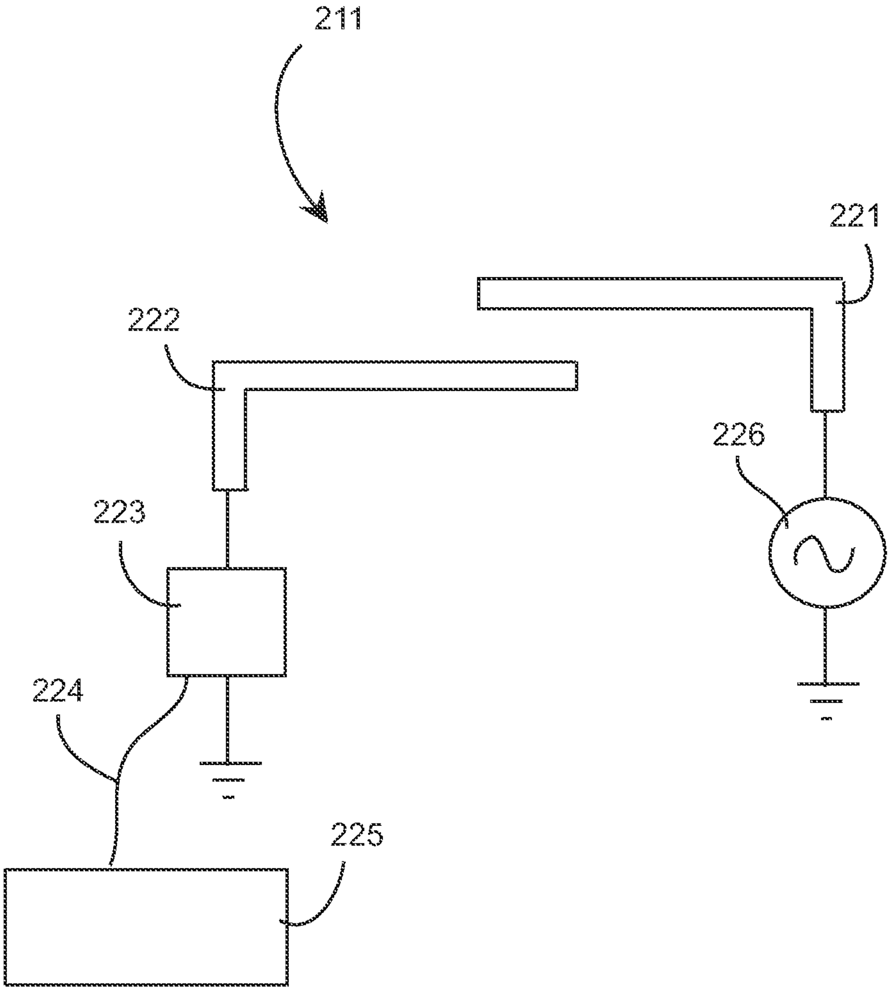
FIG. 22 shows an antenna with multiple coupled regions in accordance with an embodiment.

Referring to FIG. 22, the primary antenna 211 is shown in accordance with one embodiment. The primary antenna 211 includes a radiating element 221 coupled to a signal feed 226. A parasitic element 222 is positioned adjacent to the driven radiating element 221, and is further coupled to one or more active components 223, for example a capacitor, inductor, network of discrete or lumped components or a switch coupled with discrete or lumped components. When the parasitic element 222 is coupled to a switch network, the control signal is supplied by transmission lines 224 via general purpose input/output (GPIO), serial peripheral interface (SPI), or mobile industry processor interface (MIPI) from the transceiver 225.

Figure 24B:
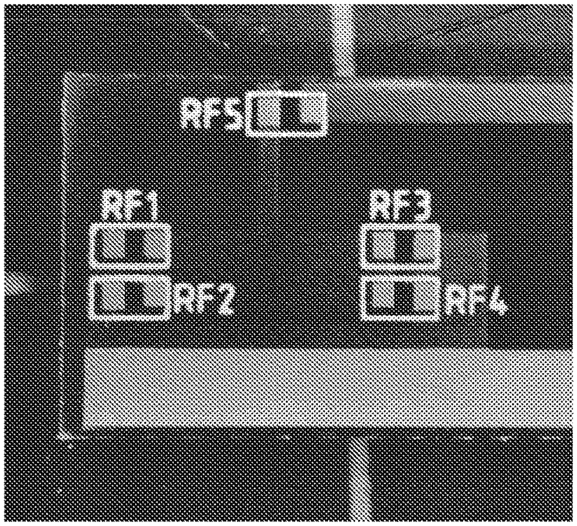
FIG. 24B is an expanded view of the plurality of components associated with the parasitic element of FIG. 24A.
Figure 24A:
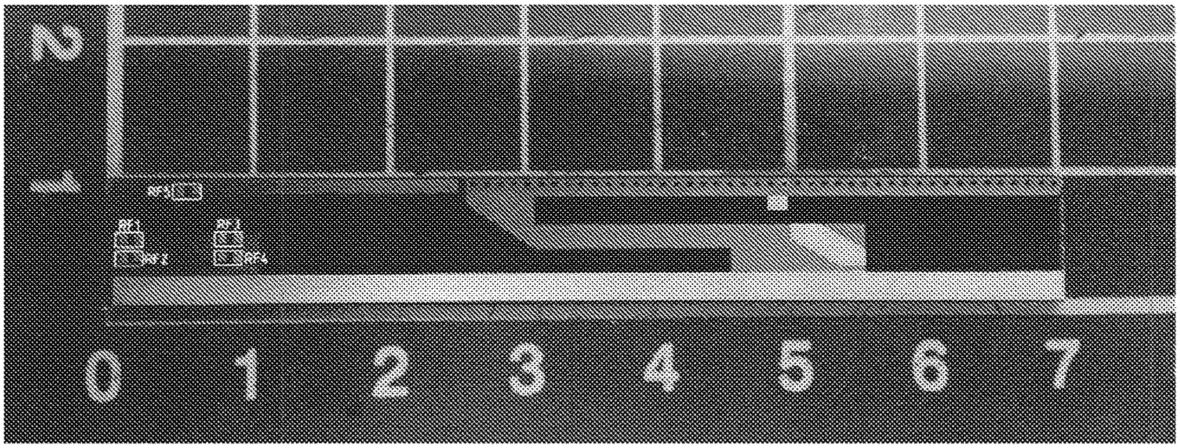
FIG. 24A shows an active antenna including an antenna radiating element and a parasitic element positioned adjacent to the radiating element, the parasitic element is coupled to a plurality of components for adjusting a characteristic of the antenna.
Figure 25:
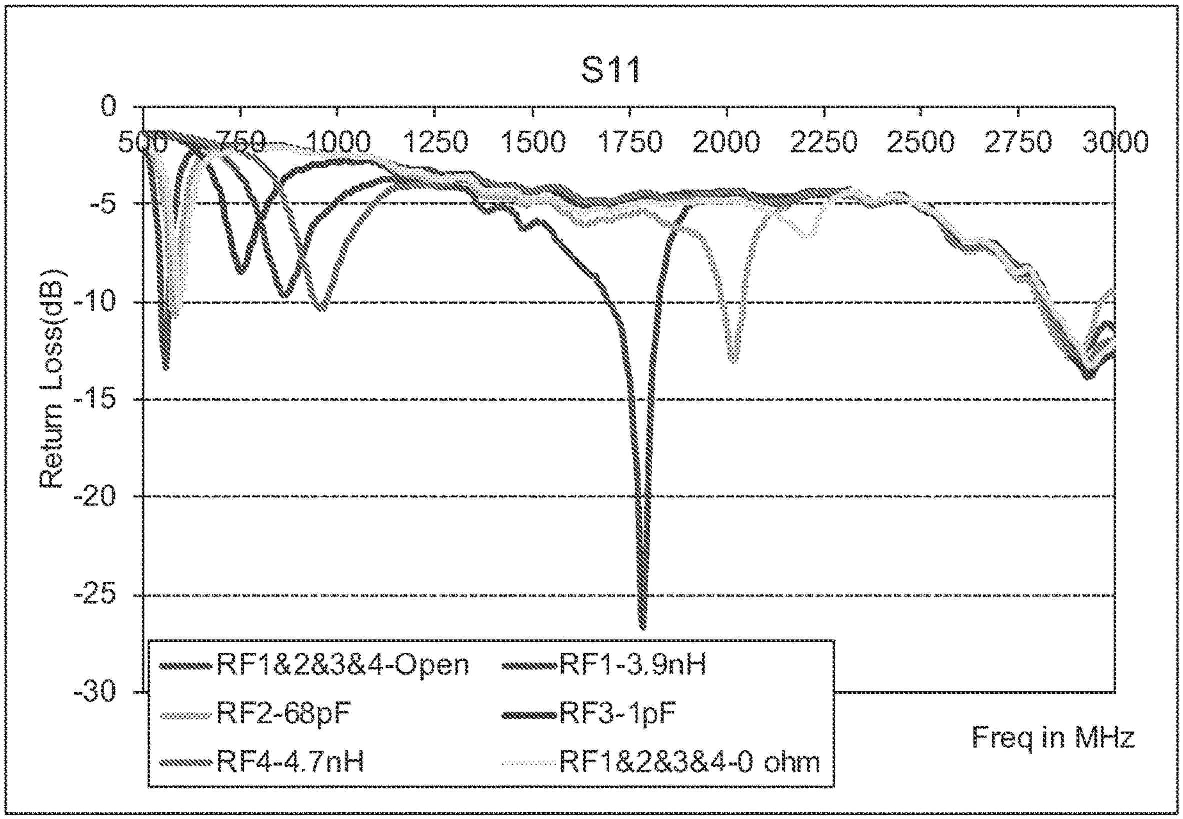
FIG. 25 shows a plot of frequency response of the antenna of FIG. 24A with respect to various configurations of the antenna achieved by varying the discrete components associated with the parasitic element.

FIG. 24A shows an antenna with multiple coupled regions. The antenna radiator is positioned adjacent to a parasitic element coupled to a plurality of components. FIG. 25B shows an expanded view of the plurality of components (RF1; RF2; RF3; RF4; and RF5). Note that as the load or reactance is varied (selecting the components), the parasitic element is adjusted for varying a frequency response of the antenna.

In one example, the antenna of FIGS. 24(A-B) was tested using the following values for the plurality of loads; RF1=3.9 nH; RF2=68 pF; RF3=1 pF; RF4=4.7 nH; RF5=0 ohm; and [RF1+RF2+RF3+RF4]=0 ohm. The resulting spectrum of the antenna frequency in various RF configurations is shown in the plot illustrated in FIG. 25.

Although certain illustrative embodiments are shown and described, it should be understood by those having skill in the art that the invention can be practiced in a plurality of similar embodiments, or combinations of the various features can be made, without departing from the spirit and scope of the invention as set forth in the claims.

We claim:

1. An antenna having multiple coupled regions, comprising:

a first element and a second element positioned above a ground plane,
    the first element connected to a transceiver,
    the second element connected to the ground plane and capacitively-coupled to the first element to form a first coupling region, wherein the second element being coupled to the ground plane is adapted to provide a static frequency response at the first coupling region, and a third element positioned above the ground plane,
    the third element connected to a tunable component, the tunable component being further connected to the ground plane, the third element being capacitively coupled to the second element to form a second coupling region, wherein the third element being connected to the tunable component is adapted to provide a dynamic frequency response at the second coupling region;

wherein the antenna is adapted to provide a first frequency response and a second frequency response that is different from the first frequency response, the first frequency response being associated with the static frequency response at the first coupling region and the second frequency response being associated with the dynamic frequency response at the second coupling region.

2. The antenna of claim 1, wherein the third element is further capacitively coupled to the first element to form a third coupling region.

3. The antenna of claim 2, wherein the third element being connected to the tunable component is adapted to provide a dynamic frequency response at the third coupling region.

4. The antenna of claim 2, wherein the antenna is further adapted to provide a third frequency response that is different from the first frequency response and the second frequency response, the third frequency response being associated with the third coupling region.

5. The antenna of claim 1, further comprising a fourth element positioned above the ground plane.

6. The antenna of claim 5, wherein the fourth element is connected to the ground plane and capacitively-coupled to the second element to form a third coupling region.

7. The antenna of claim 6, wherein the fourth element being coupled to the ground plane is adapted to provide a static frequency response at the third coupling region.

8. The antenna of claim 6, wherein the antenna is further adapted to provide a third frequency response that is different from the first frequency response and the second frequency response, the third frequency response being associated with the third coupling region.

9. The antenna of claim 1, wherein the third element comprises a first horizontal portion and a second horizontal portion that is different from the first horizontal portion, and wherein the first horizontal portion is connected to the second horizontal portion via a second tunable component.

10. The antenna of claim 1, wherein the tunable component is a first tunable component, and wherein a second tunable component is connected between the second element and the third element.

11. The antenna of claim 10, wherein the second tunable component is operable to adjust the dynamic frequency response of the second coupling region.

12. The antenna of claim 1, wherein the tunable component is one of a variable capacitor, a varactor diode, a variable inductor, a micro-electromechanical systems (MEMS) device, a metal-oxide-semiconductor field-effect transistor (MOSFET), or a switch.

13. The antenna of claim 1, wherein the first element comprises:

a vertical portion extending in a perpendicular direction away from the ground plane to a vertical terminus; and a horizontal portion extending from the vertical terminus of the vertical portion to a horizontal terminus.

14. The antenna of claim 13, wherein at least a portion of the second element is configured to overlap with at least a portion of the horizontal portion of the first element.

15. The antenna of claim 13, wherein the first coupling region is formed between the second element and the horizontal portion of the first element.

16. The antenna of claim 1, wherein the second element is connected to the ground plane via a passive component.

17. The antenna of claim 16, wherein the passive component is one of an inductor, a capacitor, or a resistor.

* * * * *